March 14, 1961  G. ERVIN, JR., ET AL  2,975,079
IMPREGNATION OF CARBON PRODUCTS
Filed Sept. 22, 1958

INVENTORS.
GUY ERVIN JR.
HERBERT F. G. DELTZ

ATTORNEY

United States Patent Office 2,975,079
Patented Mar. 14, 1961

2,975,079

IMPREGNATION OF CARBON PRODUCTS

Guy Ervin, Jr., and Herbert F. G. Ueltz, Shrewsbury, Mass., assignors to Norton Company, Worcester, Mass., a corporation of Massachusetts Filed Sept. 22, 1958, Ser. No. 762,433

5 Claims. (Cl. 117—228)

The invention relates to the impregnation of carbon products. By carbon products we mean products composed substantially of the element carbon including both those designated by industrial usage as carbon, which are poorly crystallized and sometimes considered to be amorphous, and graphite, which is well crystallized. Diamond, which is also a form of carbon, is not included in our consideration. This application is a continuation-in-part of our copending application Serial No. 625,852, filed December 3, 1956.

One object of the invention is to produce superior graphite crucibles. Another object is to produce graphite crucibles impermeable to water and impermeable to molten sodium chloride and other molten salts. Another object of the invention is to produce a superior material for furnace linings. Another object is to produce a superior material for mold linings. Another object is to produce superior storage battery plates. Another object is to produce superior graphite electrodes for use in electric furnaces and the like. Another object is to produce superior graphite brushes. Other objects are to produce superior carbon for any of the uses listed above. Another object of the invention is to provide a treatment for graphite and carbon which reduces oxidation thereof. Another object of the invention is to provide a process for the impregnation of graphite and carbon which is easy to carry out and requires only simple apparatus. Another object of the invention is to provide a process for the impregnation of carbon and graphite with refractory salt without the necessity of melting the salt. Another object of the invention is to provide an impregnating of the nature indicated which does not involve dangers to personnel.

Another object is to produce a carbon product for use as a relatively inert substantially impermeable wall constituting a container for corrosive liquids at ordinary temperatures or fused salts or metals at elevated temperatures, or a separator for different portions of electrolytic cells, and for other purposes.

Other objects will be in part obvious or in part pointed out hereinafter.

Figure 1:
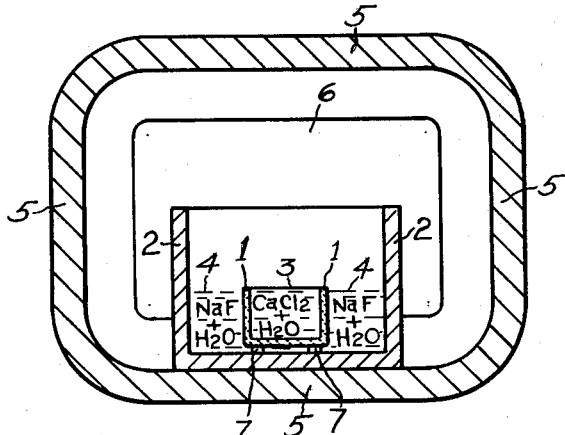
Figure 2:
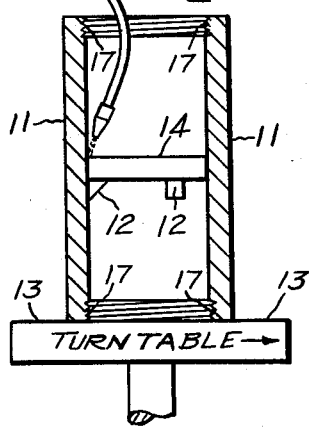
Figure 3:
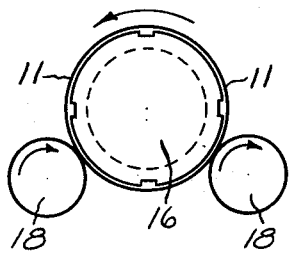

In the accompanying drawings illustrating several methods of impregnating porous carbon in accordance with this invention, Figure 1 is a cross sectional view of a vacuum box, having therein a container containing a water solution of sodium fluoride in which is a graphite crucible containing a water solution of calcium chloride, Figure 2 is an illustration of apparatus for preparing a disc of porous carbon for impregnation with alkaline earth metal fluoride, Figure 3 is an illustration of the next step for impregnating the disc with alkaline earth metal fluoride.

Graphite is a form of carbon. The invention is concerned with the impregnation of carbon, either that which has been called amorphous carbon or graphite or mixtures thereof. For a full discussion of carbon and its various forms see any recognized textbook or encyclopedia. The impregnation of diamond is of course not contemplated.

Figure 1 adequately shows one procedure. We place a shaped piece of carbon or graphite 1, herein illustrated as a crucible, in a container 2. We fill the crucible 1 with a water solution of calcium chloride 3. Then outside of the crucible 1 we fill the container 2 up to or just below the top of the crucible 1 with a water solution of sodium fluoride 4.

We provide a vacuum box 5 having a closable door 6. We insert the container 2 with its contents into the box 5, close the door 6 and evacuate the air from the box 5. The degree of vacuum is not critical. Satisfactory results can be achieved if the absolute pressure in box 5 is not higher than half a local atmosphere. A local atmosphere is the pressure of the overlying air at the time and place involved. This degree of vacuum is very easy to produce and frequently a much better vacuum may be employed. Then air is readmitted to the vacuum box 5.

The result of the foregoing procedure is that both of the water solutions enter the pores of the crucible 1. There they react to produce insoluble calcium fluoride in accordance with the following equation:

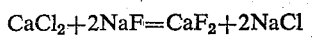
$$CaCl_2 + 2NaF = CaF_2 + 2NaCl$$

Thus the slats in solution react forming the insoluble salt $CaF_2$ which clogs the pores of the graphite or carbon crucible.

Impregnation of plates and discs can be achieved by an arrangement whereby the plate or disc with suitable sealing means at the edges is made to be a partition between two parts of a vessel or two vessels which are then separately filled with the $CaCl_2$ solution and the NaF solution, respectively, which causes the two solutions to diffuse simultaneously into the pores of the graphite thereby precipitating $CaF_2$ in the pores.

Among many methods for impregnating plates and discs with alkaline earth metal fluoride is one using the apparatus of Figures 2 and 3. Referring to Figure 2, a metal cylinder 11 has lugs 12 of which three will do with the supporting ends about mid-way of the cylinder. This cylinder 11 is placed upon a turntable 13 and a disc of porous carbon 14 is placed upon the lugs 12. The turntable 13 is rotated and the disc 14 is sealed to the inside of the cylinder 11 by molten paraffin coming through a movable tube 15. A few moments is all that is necessary to seal the disc 14 to the cylinder 11.

Then the tube 15 being removed, the upper part of the cylinder 11 is filled with one of the solutions. A cover 16, Figure 3, is then screwed on to the top of the cylinder 11, the cylinder 11 being provided with internal screw threads 17 at each end. Preferably a gasket is placed between the cover 16 and the end of the cylinder 11. Then the cylinder 11 is inverted, the remaining part is filled with the other solution, and another cover 16 with gasket is secured in place. Now the filled cylinder 11 with covers 16 at both ends and containing one solution at one end and the other solution at the other end is placed upon rollers 18 as shown in Figure 3. One of the rollers 18 is rotated and the solutions enter the disc 14 from the two sides thereof. The excess solutions may be washed away, the product may be further washed with water if desired and dried by gentle application of heat.

Articles can be impregnated without using a vacuum box although better results are attained by using one. It will suffice if the two salt solutions are on opposite sides of a piece to be impregnated which, in the case of plates or other pieces not in the shape of a container, can be a dividing wall or partition between two sides of a chamber having the two salt solutions, one on each side.

All of the procedures above described have in common that the Ca-containing solution and the fluoride-containing solution are caused to mix within the pores of the graphite or other carbon, and a precipitate of $CaF_2$ is formed inside the pores of the porous carbon thereby tending to fill the pores with $CaF_2$ and impregnate the porous carbon with solid $CaF_2$ in an effective manner.

It is usually advisable to leave a crucible having a one half inch thick wall in the container 2 for at least half an hour after it has been resubjected to atmospheric pressure. For crucibles having a one inch thick wall the length of time should be about one hour and so on. The pressure of the air or other gas in the chamber 5 might, after breaking the vacuum, be more than atmospheric and might rise to any gauge pressure desired. It is merely unnecessary for satisfactory results for most articles to go to the trouble of using a positive gauge pressure. As stated, the vacuum need not be as strong as even one inch absolute. A partial vacuum of 15″ (30″ being considered to be atmospheric) will give very good results (or 13″ if the atmosphere is 26″ etc.). Broadly speaking, therefore, the preferred process involves the steps of reducing the pressure on the shape below atmospheric and then increasing the pressure relative to the reduced pressure. Naturally any gas not deleterious to the article to be treated can be used, including all of the inert gases argon, helium, etc., and nitrogen, hydrogen, as well as others. However, there is little reason for using anything but air. The container 2 can be made of anything that is not itself soluble in water.

The concentration of the calcium chloride and of the sodium fluoride is not critical and normally solutions will be used which contain the same proportion of dissolved salt. About 4.22 grams of sodium fluoride can be dissolved in 100 grams of cold water whereas about 60 grams of calcium chloride can be dissolved in 100 grams of cold water. It does not matter which solution is in the crucible 1 and which is outside of it.

In broad terms, the process contemplates reaction between solutions of a relatively soluble alkali metal fluoride including ammonium, and of a relatively soluble alkaline earth metal salt to precipitate a relatively insoluble alkaline earth metal fluoride and also form a relatively soluble alkali metal salt. Ammonium compounds have much in common with alkali metal compounds and ammonium fluoride is included in the generic term "alkali metal fluoride" as used in this specification and claims. What is wanted is a relatively soluble fluoride compound whose action forms soluble salts with the anion of soluble alkaline earth metal salts. Mixtures of soluble fluorides may be used and mixtures of halides or other soluble salts of alkaline earth metals may be used, provided they meet the general criteria previously described. Rubidium and cesium alkali metal fluorides may be used if desired, but are not preferred because of their relative rarity. The alkaline earth metal salt may be any one of the following or mixtures thereof: calcium chloride, magnesium chloride, strontium chloride, barium chloride, calcium bromide, magnesium bromide, strontium bromide, barium bromide, calcium iodide, magnesium iodide, strontium iodide, and barium iodide.

The solubility, which is very low, of the precipitated salts is given in Table I together with the melting points of the salts in degrees centigrade. As different investigators have determined the solubility of salts in so-called cold water at different temperatures this table also gives the temperature of the water, in degrees centigrade, at which the solubility was determined:

Table I

|  | M.P., °C. | In Cold Water Sol., gms./100 gms. $H_2O$ | Temp., °C. |
| --- | --- | --- | --- |
| Calcium Fluoride | 1,360 | .0016 | 18 |
| Magnesium Fluoride | 1,396 | .0076 | 18 |
| Strontium Fluoride | 1,190 | .011 | 8 |
| Barium Fluoride | 1,280 | .17 | 10 |

On the other hand the other halides of the alkaline earth metals mentioned are much more soluble in cold water. Table II gives their solubility in grams per 100 grams of water at the water temperature indicated in degrees centigrade. Table II also gives the solubility of sodium fluoride and potassium fluoride. While the former is cheaper the greater solubility of potassium fluoride makes it preferred for some uses of the process, for example especially where the piece to be impregnated is quite thick. Ammonium fluoride, which can also be used as it is soluble, is also given in this table.

Table II

|  | In Cold Water Sol., gms. per 100 gms. $H_2O$ | Temp., Degrees Cent. |
| --- | --- | --- |
| Sodium Fluoride | 4.22 | 18 |
| Potassium Fluoride | 92.3 | 18 |
| Ammonium Fluoride | 81.4 | 25 |
| Calcium Chloride | 59.5 | 0 |
| Magnesium Chloride | 54.25 | 20 |
| Strontium Chloride | 43.5 | 0 |
| Barium Chloride | 31 | 0 |
| Calcium Bromide | 125 | 0 |
| Magnesium Bromide | 101.5 | 20 |
| Strontium Bromide | 85.2 | 0 |
| Barium Bromide | 98 | 0 |
| Calcium Iodide | 66 | 10 |
| Magnesium Iodide | 100 / 148 | 0 / 18 |
| Strontium Iodide | 165.3 | 0 |
| Barium Iodide | 170 / 205 | 0 / 20 |

Porous carbon products impregnated in accordance with the invention are useful for the purposes listed in the objects. Ordinary graphite crucibles are permeable to water at any temperature and are also permeable to molten salts. Impregnating them with fluoride salt according to the invention makes them impermeable to water at any temperature and impermeable to molten salt at a temperature below their melting points which are high. For some purposes graphite furnace linings which are impermeable are desired and graphite or other carbon pieces for furnaces impregnated in accordance with the invention are useful up to the melting points shown in Table I. For the same reason articles made according to the process of the invention are useful as mold linings. For the casting of many metals graphite is a good material as it can be readily shaped but the porous graphite is sometimes unsatisfactory wherefore graphite or other carbon impregnated in accordance with the invention is useful for mold linings. Some storage battery plates are made out of graphite and for some such batteries non-porous graphite is preferred.

For electric arc furnaces where the temperatures employed are below the melting point of the fluoride used graphite or other carbon electrodes impregnated in accordance with the invention will have longer lives than unimpregnated graphite or other carbon electrodes. Brushes for generators and motors for use on airplanes are now usually impregnated with some material to eliminate or minimize dusting. Our process is a very satisfactory process for the impregnation of these brushes and the fluorides mentioned inhibit dusting. Impregnation with any of these fluorides also inhibits oxidation of graphite or other carbon. The process is simple and easily carried out and has all of the advantages mentioned in the objects.

There are other soluble salts of alkaline earth metals which, with KF or NaF, can be used in this invention. We define a salt as soluble for the purposes of this invention if its solubility is at least one gram in 100 grams of water at about 20° C. The salts that we know about are the nitrates, the acetates and magnesium sulphate, but there are doubtless many others and thus we claim for this ingredient any soluble salt of alkaline earth metal. The ones above mentioned are $Ca(NO_3)_2$, $Mg(NO_3)_2$, $Sr(NO_3)_2$, $Ba(NO_3)_2$, $(CH_3COO)_2Ca$, $(CH_3COO)_2Mg$, $(CH_3COO)_2Sr$, $(CH_3COO)_2Ba$, $MgSO_4$.

From one point of view one of the procedures herein described and one combination of salts may be the best mode of the invention, from another point of view another procedure may be better and from another point of view another combination of salts may be better. From any point of view the best mode known to us is disclosed herein. For purposes of the statute we select the procedure when the gas tight cover is placed on the crucible and it is impregnated by vacuum as the best mode, and the combination of calcium chloride and potassium fluoride or sodium fluoride as the best mode for the salts.

It will thus be seen that there has been provided by this invention a process for the impregnation of carbon products in which the various objects hereinabove set forth together with many thoroughly practical advantages are successfully achieved. As many possible embodiments may be made of the above invention and as many changes might be made in the embodiments above set forth, it is to be understood that all matter hereinbefore set forth, or shown in the accompanying drawing, is to be interpreted as illustrative and not in a limiting sense.

We claim:

1. Process of impregnating porous carbon with insoluble salt consisting in applying simultaneously from two sides of said carbon a water solution of soluble fluoride of alkali metal on one side and a separate water solution of soluble halide of alkaline earth metal on the other side, causing said different solutions simultaneously to penetrate into the pores of said carbon and therein to precipitate insoluble alkaline earth metal fluoride.

2. Process according to claim 1 in which the fluoride of alkali metals is selected from the group consisting of sodium fluoride and potassium fluoride and mixtures thereof.

3. Process according to claim 2 in which the halide is calcium halide and the precipitate is calcium fluoride.

4. Process according to claim 1 in which the halide is calcium halide and the precipitate is calcium fluoride.

5. Process of impregnating porous carbon with insoluble salt consisting in applying simultaneously from two sides of said carbon a water solution of soluble fluoride of alkali metal on one side and a separate water solution of soluble salt of alkaline earth metal on the other side, causing said different solutions simultaneously to penetrate into the pores of said carbon and therein to precipitate insoluble alkaline earth metal fluoride.

References Cited in the file of this patent

UNITED STATES PATENTS

| | | |
|---|---|---|
| 1,895,756 | Fuller | Jan. 31, 1933 |
| 2,530,984 | Moberly | Nov. 21, 1950 |
| 2,754,231 | Ramadanoff et al. | July 10, 1956 |